June 28, 1966   LE BRON HARDIE   3,258,778
CHART CHANGER FOR RECORDER
Filed Aug. 5, 1964   6 Sheets-Sheet 1

INVENTOR
LeBron Hardie
BY
ATTORNEYS

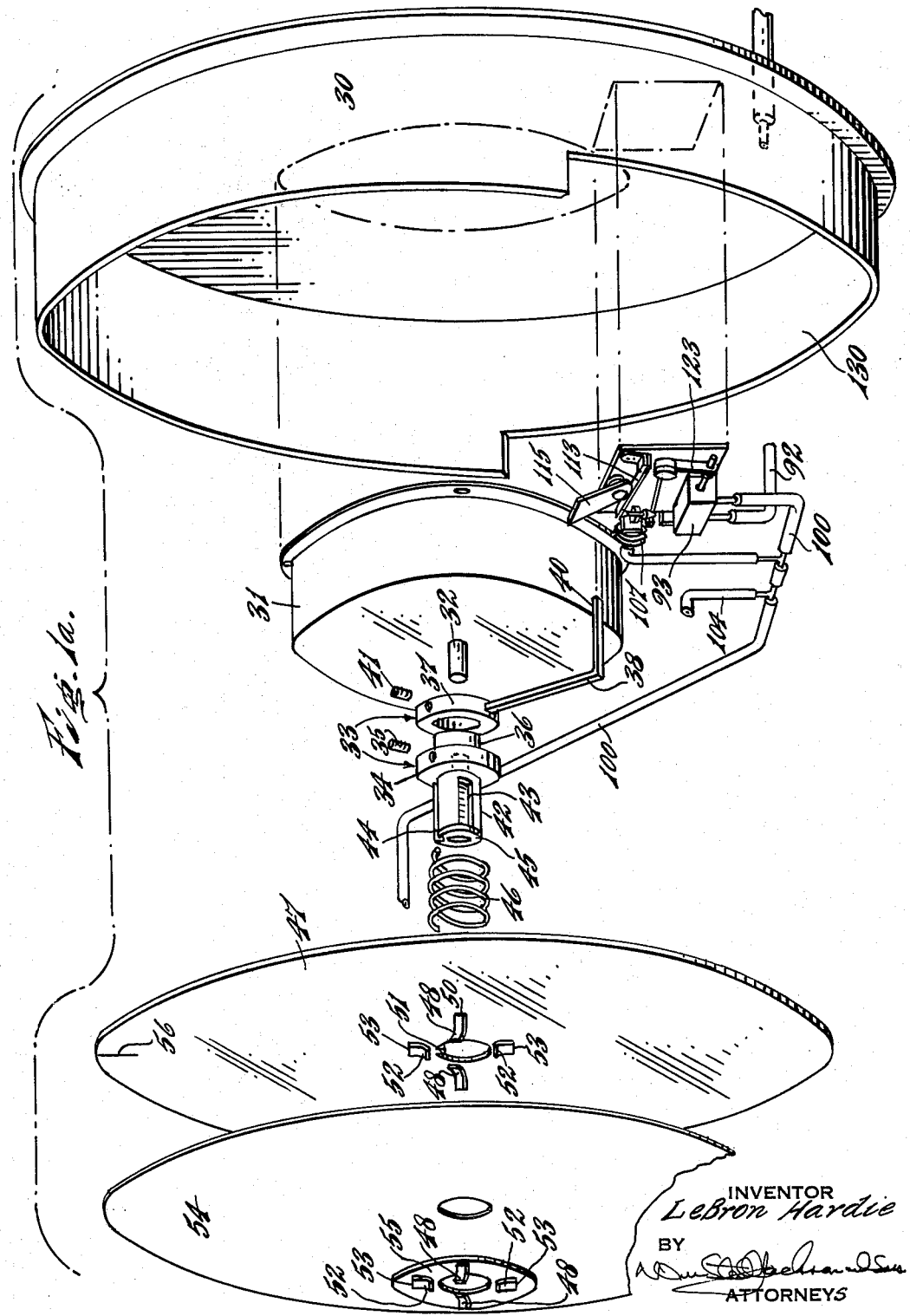

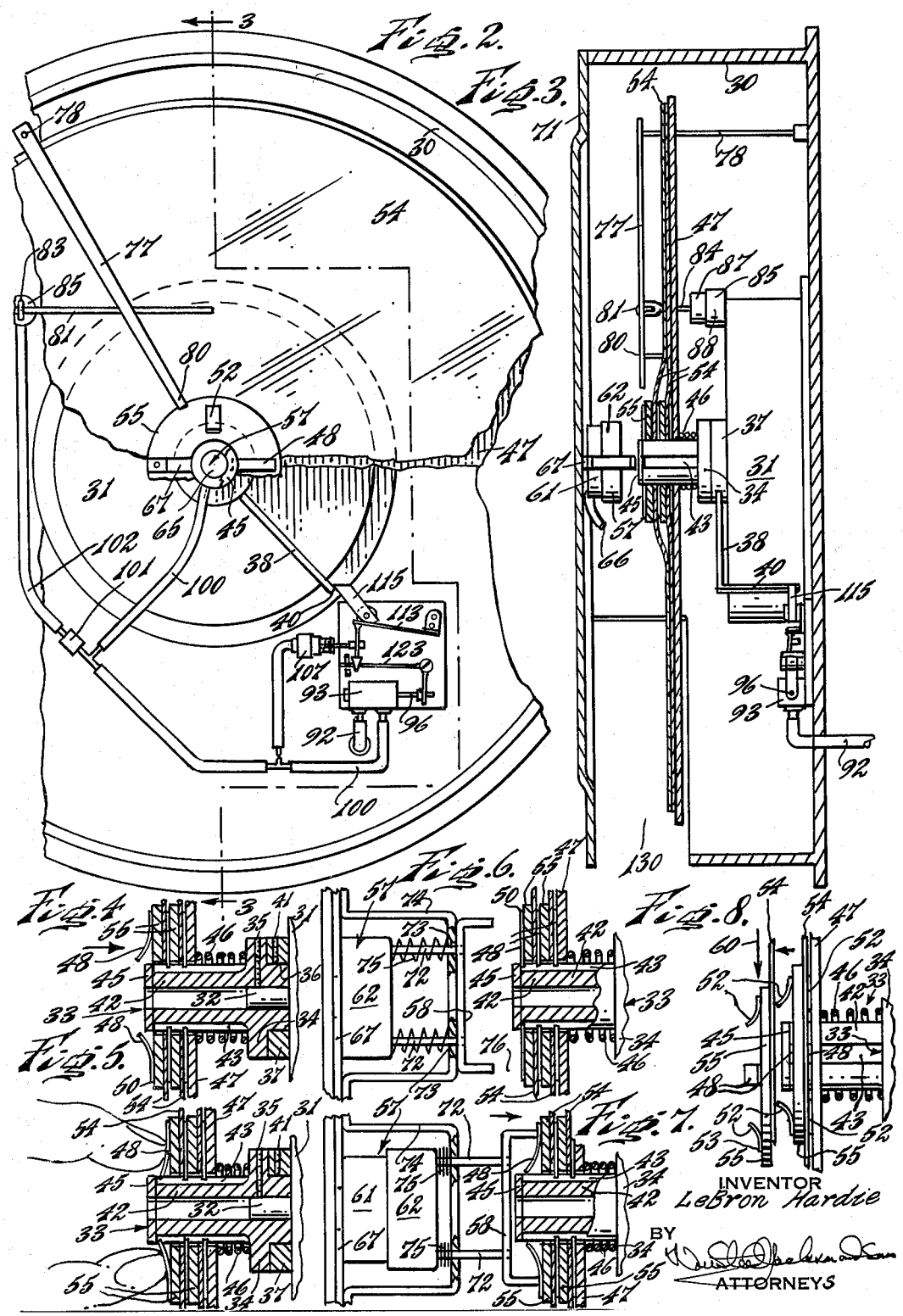

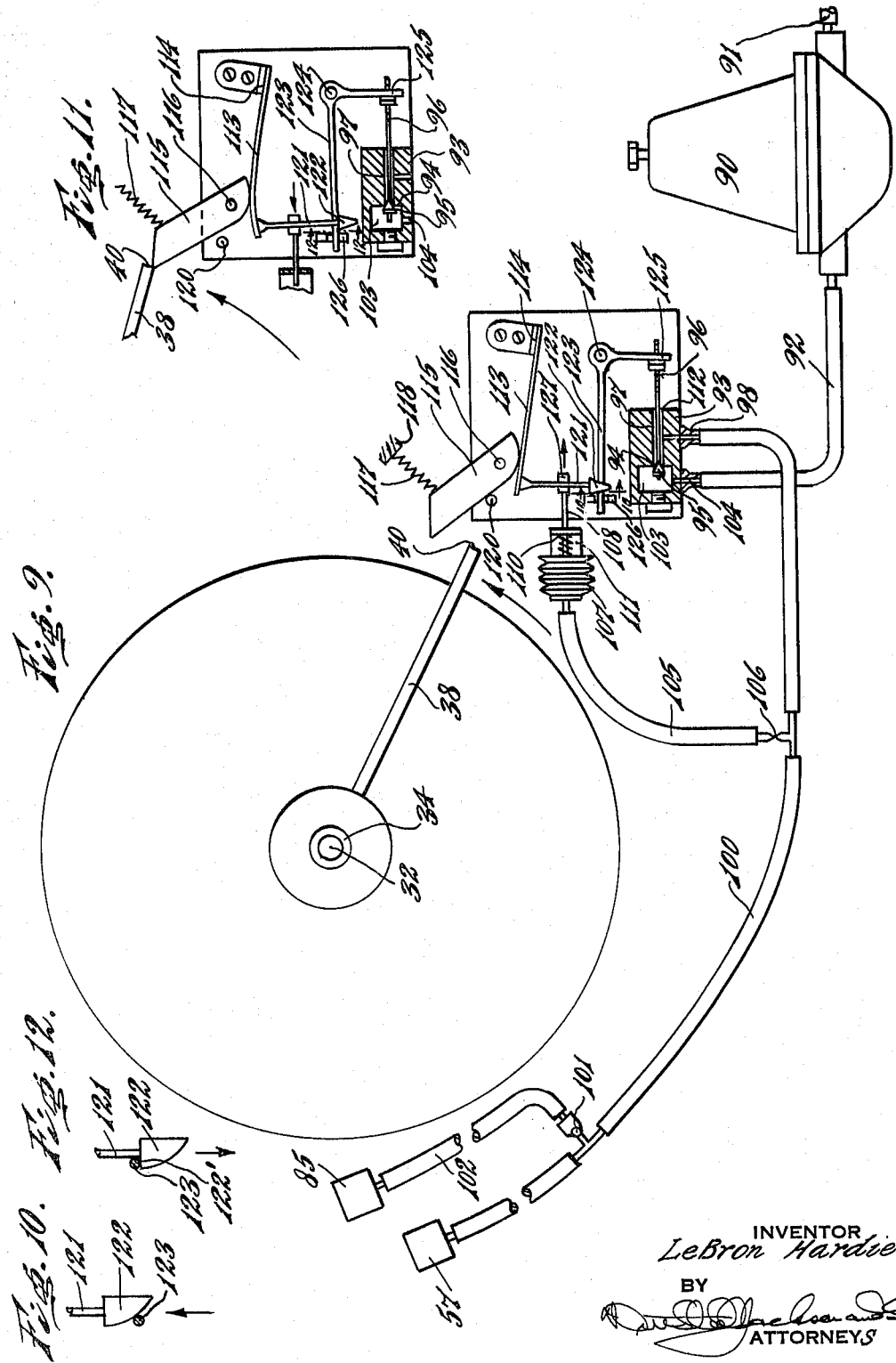

June 28, 1966 LE BRON HARDIE 3,258,778
CHART CHANGER FOR RECORDER
Filed Aug. 5, 1964 6 Sheets-Sheet 5
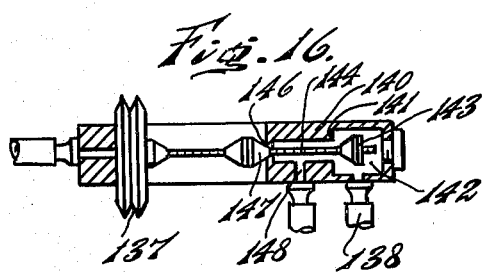
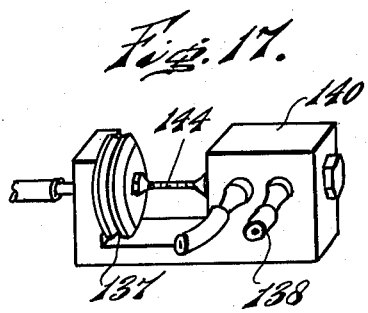
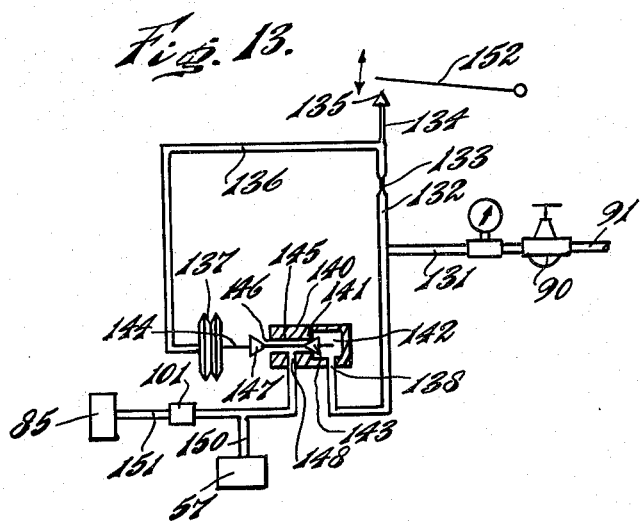
INVENTOR
LeBron Hardie
BY
ATTORNEYS June 28, 1966  LE BRON HARDIE  3,258,778
CHART CHANGER FOR RECORDER
Filed Aug. 5, 1964  6 Sheets-Sheet 6
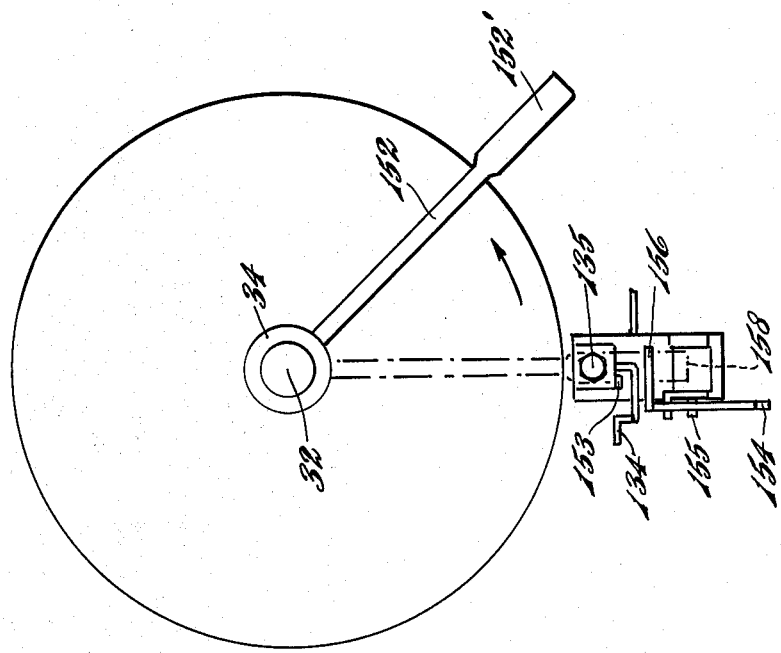
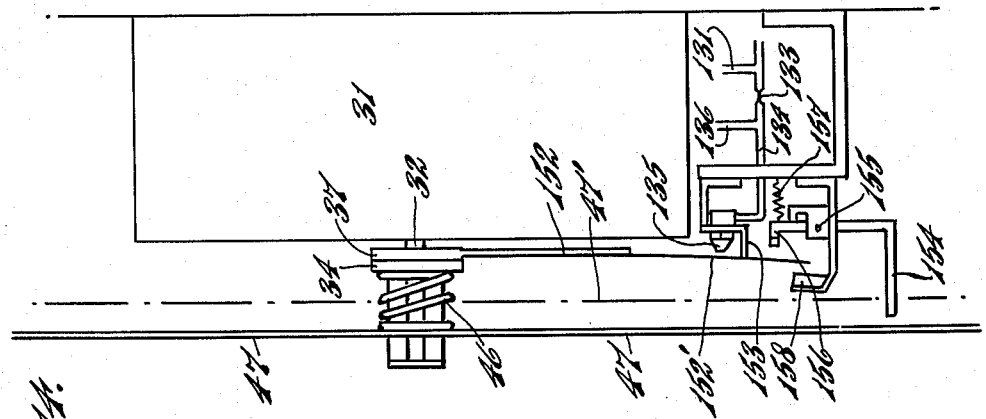
INVENTOR
LeBron Hardie
BY
ATTORNEYS

United States Patent Office 3,258,778
Patented June 28, 1966

3,258,778
CHART CHANGER FOR RECORDER
Le Bron Hardie, 3115 Aurora Ave., El Paso, Tex.; Alice King Hardie, independent executrix of Le Bron Hardie, deceased
Filed Aug. 5, 1964, Ser. No. 387,580
18 Claims. (Cl. 346—137)

The present invention relates to chart changes for recording charts which are operable automatically.

A purpose of the invention is to simplify and improve chart changers which automatically change a chart on a recorder.

A further purpose is to eliminate the need for using a specially constructed chart motor in an automatic chart changer.

A further purpose is to minimize the force required from the chart motor to operate a chart changer, so as to facilitate automatic changing of charts even when the chart is turned by a motor of relatively low power.

A further purpose is to permit the use of standard charts with chart changers.

A further purpose is to facilitate the setting of the time when charts are automatically changed.

A further purpose is to make it possible to change charts in response to some condition other than the angular position of rotation of the chart to be changed.

A further purpose is to provide for automatically moving the pen or pens away from the chart while the chart is being changed.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURES 1 and 1a together form an exploded perspective of one embodiment of the device of the invention, the left hand portion of the view being in FIGURE 1 and the right hand portion in FIGURE 1a.

FIGURE 2 is a front elevation of the device of FIGURES 1 and 1a, partially broken away to show interior mechanism.

FIGURE 3 is a section of FIGURE 2 on the line 3—3.

FIGURE 4 is an enlarged fragmentary axial section of the shaft, hub and related parts during the early stages of applying a new chart and a chart retaining disc on the hub.

FIGURE 5 is a view similar to FIGURE 4 showing the pressing of the latches into latching position by the fingers.

FIGURE 6 is a view similar to FIGURES 4 and 5 showing the charts in position on the hub and the mechanism for pushing the chart retaining discs axially, in retracted position.

FIGURE 7 is a view similar to FIGURES 4 to 6 showing the mechanism for pushing the chart retaining disc in advanced position to remove a chart.

FIGURE 8 is a view similar to FIGURES 4 to 7 showing the removal of the first chart, the plane of the section being at right angles to FIGURES 4 to 7.

FIGURE 9 is a diagrammatic view, partially broken away, of one form of pneumatic relay utilized in the invention.

FIGURE 10 is an enlarged section of FIGURE 9 on the line 10—10.

FIGURE 11 is a fragmentary view corresponding to a portion of FIGURE 9 showing the relay in the position to actuate the fluid motors.

FIGURE 12 is an enlarged section on the line 12—12 of FIGURE 11.

FIGURE 13 is a diagrammatic view of a modified relay device according to the invention.

FIGURE 14 is a diagrammatic axial section of a chart changer with the relay of FIGURE 13.

FIGURE 15 is a diagrammatic front elevation of the device of FIGURES 13 and 14.

FIGURE 16 is an enlarged axial section of the valve operating fluid motor of FIGURES 13 to 15.

FIGURE 17 is a perspective of the valve operating fluid motor and valve of FIGURES 13 to 16.

Figure 1:
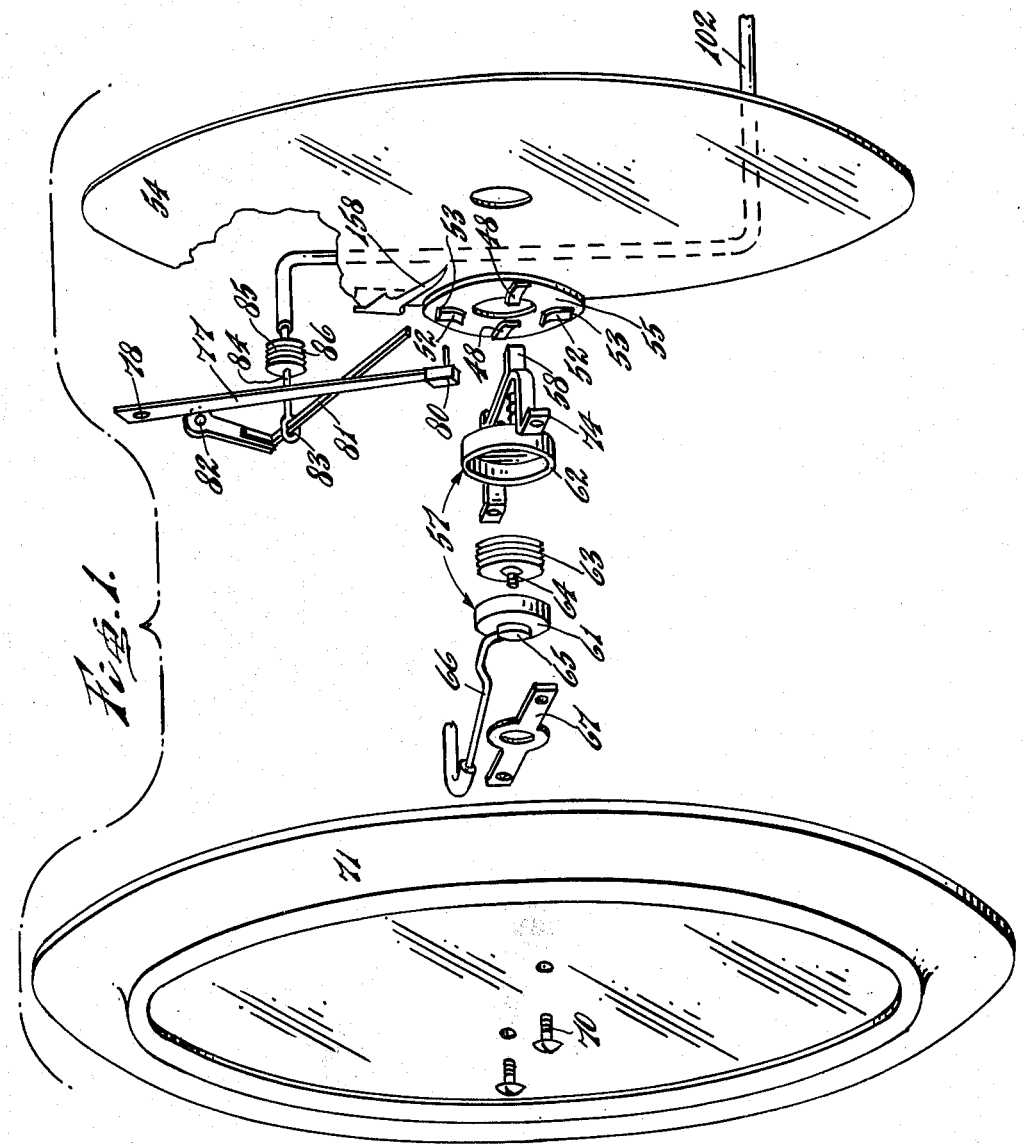

Describing in illustration but not in limitation and referring to the drawings:

There are at present on the market several forms of automatic chart changers. Such a device is used as an accessory on an instrument which measures a variable and continuously plots an inked record of such measurement upon a rotating circular chart. Without attempting to limit to any particular field of utility, it will be evident that such devices are commonly used in instruments which record temperature, pressure, flow, composition of reaction materials, reaction conditions or the like.

To avoid the necessity of placing and removing each separate chart manually, automatic chart changers are used. The automatic chart changer commonly permits placing several charts at a time on the chart motor of the instrument, and a provision is made to release one chart at a time after it completes a rotation, the released chart dropping into a hopper where it remains to be picked up by the person who is attending the instrument. See Squier U.S. Patent No. 2,926,059; Daugherty U.S. Patent No. 2,978,287; Maeder U.S. Patent No. 3,064,261; Stoops U.S. Patent No. 3,103,402; and Pitter U.S. Patent No. 1,873,633.

Automatic chart changers are particularly convenient and economical when the recording instrument is located at a distant point. Considerable time and expense can then be eliminated because several charts rather than only one chart may be picked up each time the instrument attendant visits the instrument.

There are other situations in which automatic chart changers are convenient. For example, it is sometimes desirable to change charts at some inconvenient time during a twenty-four hour period, such as at night or on a weekend when there is no one on duty to perform this tasks. In other cases it may be desirable to change charts on a number of instruments at precisely the same moment, and it is difficult to do this manually.

Referring first to the embodiment of the invention shown in FIGURES 1 to 12, inclusive, a meter case 30 as shown in FIGURE 1a mounts a chart motor 31 which will conveniently be any suitable motor such as a spring motor or an electric motor, which turns a chart turning shaft 32 at a regulated speed, commonly turning one revolution in twenty-four hours. The shaft 32 mounts a hub assembly 33, best seen in FIGURES 1a and 4 to 8, which includes a hub 34 secured in adjustable position by a set screw 35. The hub 34 has a recessed portion at its rearward end at 36 and this recessed portion receives a separate collar 37 which carries an arm 38 having an offset portion 40 extending parallel to the axis as best seen in FIGURE 3 and travelling around the outside of the chart turning motor 31. The collar 37 is angularly adjusted with respect to the hub 34 by loosening set screw 41 and then appropriately tightening it again.

The hub 34 has a reduced generally cylindrical portion 42 remote from the motor 31 best seen in FIGURES 1a and 4 to 8, which is longitudinally slotted to form latching recesses 43 suitably at diametrically opposed positions to receive latches as later explained and also has a longitudinal slot 44 at an intermediate point (FIGURE 1a). At the outer end there is fastened to the hub a latching projection 45 of disc form suitably of the same diameter as the hub portion 42 and extending across the ends of the latching recesses 43, the latching projection 45 being, however, recessed in prolongation of the slot 44 as shown in FIGURE 1a. The latching projection 45 is attached in any suitable manner, as by welding not shown.

The hub portion 42 is surrounded by a helical compression spring 46 which when released is suitably longer than the hub portion 42, and which is compressed by a chart plate 47. The chart plate is retained on the hub against the action of the helical spring 46 by leaf spring latches 48 best seen in FIGURES 1a and 4 to 7. The leaf spring latches 48 are fastened to the chart plate, or, as later explained, to one of the chart retaining discs at their ends 50 remote from the hub as by soldering, and, as shown in FIGURES 1a and 4, when they are released, spring to a position radially beyond the latch retaining projection 45 so that they do not interfere with axial movement of the chart plate or chart retaining disc along the hub.

These leaf spring latches 48 when pressed into a plane approximating the plane transverse to the axis as shown in FIGURE 5, however, engage behind the latching projection 45 and prevent motion of the chart plate or disc axially by retaining it in place, as shown in FIGURE 6. If, however, the outermost one is permitted to spring into its retracted position as shown in FIGURE 7, the corresponding chart plate or disc is released to be pushed off the hub by the action of helical spring 46 as later explained.

It is important that the pressure of helical compression spring 46 is greater than that exerted by the combined leaf spring latches so that all the leaf spring latches will be extended straight in the position of FIGURE 6 unless action is taken to unlatch a particular chart. The helical compression spring 46 always presses the chart plate 47 as far toward the outer end of the hub as it can be pushed, depending on the number of charts and chart retaining discs which are in place. The chart plate 47 has a tongue 51 as shown in FIGURE 1a which extends into longitudinal slot 44 of the hub so that the chart plate always turns with the shaft 32 and the hub assembly 33. The chart plate has positioned at a different angular position from the latching leaf springs 48, pusher leaf springs 52 as best seen in FIGURES 1 and 1a, which are anchored as by solder at the outer ends at 53 and which tend to push the outermost chart off the hub when the chart is released. The pusher springs 52 while extending to an inward position close to the opening in the chart plate do not, even when they are flattened, touch the hub and so do not perform any latching function. The pusher leaf springs 52 tend to prevent the possibility that a chart will not drop immediately after release because the chart around the hole catches on the latching projections or because it is held by static electricity, or some unintended adhesive action.

Immediately in front of the chart plate 47 there is a chart 54 surrounding the hub with a suitable cutout for the hub as well known. In front of this chart 54 is a chart retaining disc 55. This is one of a series of alternate charts, and chart retaining discs in front of them, extending out to the outermost end of the hub. Each of these chart retaining discs 55 resembles the chart plate except that it is of considerably smaller outside diameter, it has no tongue 51 extending into the slot 44, since it turns in any case in frictional engagement with the hub and the next chart, and it does not need any time mark 56 as positioned on the chart plate. Each of the chart retaining discs, however, has the leaf spring latches 48 and has the pusher leaf springs 52 as previously described. Each chart retaining disc 55 is loaded on to the hub in the same manner as previously described and as indicated in FIGURES 4, 5 and 6.

For the purpose of accomplishing automatic release of the outermost chart, reference will be made particularly to FIGURES 1 and 12. A suitable motor 57 actuates a forked pusher 58 to push the sequence of chart retaining discs 55 and charts 54 and the chart plate 47 further on to the hub 33 against the action of helical compression spring 46 to a sufficient distance so that leaf spring latches 48 can spring to open position as shown in FIGURE 7 and release the latches for the outermost chart retaining disc 55. When the forked pusher 58 backs off or retracts, the expansion of the helical compression spring 46 as shown in FIGURE 8 pushes the outermost chart retaining disc 55 and the outermost chart off the end of the hub so that they drop as suggested by arrow 60 in FIGURE 8. The pushing off of the outermost chart 54 is aided by pusher leaf springs 52 as also shown in FIGURE 8. At the same time the next chart retaining disc 55 is pushed out until its latches 48 engage the latching projection 45 as shown in FIGURE 6, bringing the next chart 54 to operative position.

While any desired character of motor 57 can actuate the chart changer, the preferred form is a fluid motor consisting as shown in FIGURE 1 of an inner telescoping cup 61 slidably cooperating with an outer telescoping cup 62 and containing an expansible fluid actuated bellows 63, conveniently a metallic or rubber bellows, which has a threaded shank 64 provided with a fluid inlet connection which threads into a tubular socket 65 in the inner cup 61, making fluid connection with a tube 66. The cup 61 is mounted as by welding to bracket 67 which is secured by screws 70 to a suitable transparent plastic cover 71 secured to the front of the recorder in any suitable way, not shown.

The outer telescoping cup 62 has axial extensions 72 as best seen in FIGURES 6 and 7 which mount at the end toward the recorder the forked pusher 58. The extensions 72 from the outer cup are guided by openings 73 in a guiding bracket 74 secured to the cover 71 by the screws 70. Helical compression springs 75 surrounding the extensions 72, retract the motor and the forked pusher 58 when fluid pressure is released.

When in retracted position the forked pusher 58 is concentric with the hub and has an air gap at 76, FIGURE 6, which is adequate to allow the outermost chart retaining disc 55 and chart 54 to fall when they are released, a distance of 3/16" being found to be sufficient in practice. Each time that fluid pressure enters the fluid motor 57 and then is exhausted from it, a chart is released.

The recorder has a spring steel pen arm 77, FIGURE 1, pivoted at 78 and carrying a pen 80, moved in any suitable way not shown to make a suitable written record on the chart. The pen arm 77 operates in front of a pen retracting arm 81 which is pivoted at 82 and which is surrounded by a slotted end 83 of a plunger 84 from pen arm retracting motor 85, suitably a fluid motor having a bellows 86 shown in FIGURE 1 surrounded by an inner telescoping cup 87 secured to the plunger 84 and an outer telescoping cup 88 mounted for example on the case of the recorder as shown in FIGURE 3.

A suitable relay assembly, which may for example be a pneumatic relay, operates these fluid motors as best seen in FIGURES 1a, 2, 3 and 9 to 12 inclusive. A pressure regulator 90 (FIGURE 9) receives compressed air through a connection 91 and discharges it through a connection 92 to a valve 93. The valve has a seat 94 which is closed by a reciprocating valve plunger 95 shown in closed position in FIGURE 9 and in closed position in FIGURE 11, and having a stem 96 extending in spaced relation through a passage 97 to a position outside the valve. From the passage 97 there is a lateral connection 98 which connects to a fluid piping system 100 extending directly to the forked pusher actuating motor 57 and extending through a special check valve 101 to be described in a piping branch 102 to pen arm retracting motor 85. The valve 95 operates in a valve chamber 103 which is connected by a passage 104 to the inlet fluid pressure connection 92.

As long as there is fluid pressure in valve chamber 103 and no action to force the valve open, the valve 94 will remain closed against its seat 94. When the valve 95 has opened as later explained, however, pressure passes through the output piping connections 100 and 102. In these connections there is a branch 105 which has a restricted orifice 106 (FIGURE 9) and this connects to fluid actuated motor or bellows 107 which operates a plunger 108 guided at 110 and retracted by a helical compression spring 111 acting from the guide.

Check valve 101 in the piping branch connected to the pen retracting motor 85 opens toward the motor 85 and does not impede forward action of the motor 85, but impedes retraction of the motor 85. The check valve 101 slightly leaks so that the retraction of the motor will take place over a course of several seconds when the system is connected to atmosphere through opening 112 between valve stem 96 and passage 97. The bellows of the motor 85, like the others described, tends to retract by inherent spring action.

The valve 95 always remains closed due to the entrainment of air from passage 103 through opening 112 except for the time that it is opened by pushing on valve stem 96 as later explained. There is no mechanism provided to pull on valve stem 96 and therefore its closing action is due to the air entrainment.

A leaf spring 113 is supported at one end at 114 as best seen in FIGURES 9 and 11, and this is acted on by cam 115 pivoted at 116. Cam 115 is moved into operative position by arm 38 turning with the chart shaft and is retracted by helical compression spring 117 acting from spring abutment 118 and the cam is limited in motion by stop 120. Leaf spring 113 has a rod 121 secured to the end opposite from the anchorage 114 as by soldering and the rod 121 has a cone tip 122 seen also in FIGURES 10 and 12. This cone tip operates in relation to one arm of a bell crank 123 pivoted at 124 and capable in its operative stroke of pushing on the end of valve stem 96 to open valve 95.

The bell crank 123 is restrained against excessive forward movement by stop 126.

There are in effect the following operative positions of the parts:

(1) When arm 38 is not in engagement with cam 115 as shown in FIGURE 9, leaf spring 113 is retracted, tip 122 is retracted as shown in FIGURES 9 and 10 and valve 95 is closed under the action of the entrained air.

(2) When arm 38 engages cam 115 as shown in FIGURE 11, leaf spring 113 is deflected forward and tip 122 has pushed the bell crank against stop 126 and deflected tip 122 until it is extended past the bell crank and has engaged the bell crank behind its shoulder 122' as shown in FIGURES 11 and 12. The valve 95 still remains closed under the action of the entrained air.

At the moment arm 38 releases cam 115 to return to its inactive position as shown in FIGURE 9, leaf spring 113 retracts and the shoulder 122' of tip 122 moves the cooperating end of the bell crank with it, pushing on the end of valve stem 96 to momentarily open valve 95. This energizes fluid actuated motor 107 to project forward plunger 108 which by its cam 127 on the end bends rod 121 upward so that shoulder 122' releases bell crank 123 and allows valve 95 to close under the force of entrainment of air.

When the relay has output pressure, fluid motors 57 and 85 expand rapidly, but cam motor 107 expands much slower because of the restricted orifice 106, so that cam motor 107 does not begin to expand until the expansion of motors 57 and 58 is complete. When cam motor 107 does act, its plunger 108 pushes cam 127 forward to disengage the conical end 122 of rod 121 from lever 123 as just explained, and then the entrainment of air by valve 95 causes valve 95 to close against its seat 94, thus cutting off fluid pressure from the various fluid motors and allows them to exhaust through opening 112 in valve passage 97.

The output pressure then falls to approximately zero and chart changing motor 57 retracts rapidly, while pen arm retracting motor 85 retracts much more slowly because of the action of the slowly leaking check valve 101.

The retraction of cam motor 107 brings its cam 127 back to its initial position.

In operation of the form of FIGURES 1 to 12, inclusive, with the front of the recorder removed, the operator will fill the recorder with a succession of charts 54 and chart retaining discs 55, positioning them as shown in FIGURES 4, 5 and 6 until the leaf spring latches 48 hold the sequence in place.

The outermost chart 54 is engaged by the pen 80 of the pen arm 77 and a chart line is plotted thereon until hub arm 38 engages cam 115 as shown in FIGURES 9 and 11, and first deflects leaf spring 113 and rod 121 to push cone head 122 to engage bell crank 123, after which the release of cam 115 permits leaf spring 113 to retract and cone head 122 moves bell crank 123 to open valves 95. Fluid pressure then flows through fluid pipe system 100, and energizes chart changing motor 57, pushing forked pusher 58 from the position of FIGURE 6 to the position of FIGURE 7, so that leaf spring latches 48 of the outermost chart retaining disc 55 disengage as shown in FIGURE 7. At the same time that this is happening, pen arm retracting motor 85 is energized since the check valve 101 opens immediately and does not impede flow into fluid piping system 102. The spring steel pen arm deflects to raise the pen from the paper so that no extra meaningless mark will be made on the paper of the chart.

Fluid pressure through restricted orifice 106 actuates cam motor 107 to project forward cam 127, deflecting cone arm 121 from lever 123 and valve 95 is closed by the entrainment of air, retracting lever 123, air escaping through passage 97 and out port 112. As soon as the valve 95 closes, chart changing motor 57 retracts.

The pen arm has left the paper, and the forked pusher 58 retracts to the position of FIGURE 6, and the outermost chart retaining disc 55 and chart 54 are pushed off the front of the hub by helical compression spring 46 pushing back the chart plate and the remaining sequence of charts 54 and chart retaining discs 55. An extra push to the outermost chart is given by the leaf spring pushers 52 as shown in FIGURE 8.

The releasing chart 54 and chart retaining disc 55 then drop through a bottom opening 130 of the instrument case into a suitable hopper below (FIGURE 3).

The retraction of pen arm retracting motor 85 is delayed by leakage of air from leaky check valve 101 so that the old chart 54 has time to drop and the next chart is positioned before the pen arm is returned.

An alternate and preferred form of relay is shown diagrammatically in FIGURES 13 to 17. Compressed air from a source 91 passes through a regulator 90 and passes through a pipe 131 to a pneumatic piping system 132 which branches and at one end extends through a constriction 133 and a pipe 134 to an orifice 135, the orifice and the pipe 134 being larger than the constriction 133. The pipe 134 has a branch connection 136 which connects to an axially acting valve controlling fluid motor or bellows 137. The pipe 132 also has a branch which extends into a port 138 of a valve 140. The valve 140 has a valve seat 141 and a valve chamber 142 communicating with the port 138, the valve seat being closed by a valve plunger 143. The valve plunger is mounted on a valve stem 144 which extends in spaced relation through a valve passage 145 and has at the opposite end a valve seat 146 which is capable of being closed by a valve element 147 on the stem.

The valve passage 146 has a port 148 which connects by a pipe 150 with the chart changer motor 57 and through check valve 101 and pipe 151 connects with pen arm retracting motor 85. Check valve 101 opens toward motor 85.

A flapper 152 carried by the hub 33 engages and closes orifice or jet opening 135 and prevents the air pressure from exhausting to atmosphere through the jet. Consequently the bellows or valve actuating motor 137 is energized, whereas formerly the pressure in it has been at atmospheric pressure. Whereas formerly there was no pressure available in the system to operate the fluid actuated motors 57 and 85, once the flapper 152 closes the nozzle 135, bellows 137 shifts and brings valve element 147 against seat 146 while opening valve plunger 143, and allows pressure from pipe 132 to be transmitted to fluid actuated motors 57 and 85 and cause them to expand. The motors are then free to contract except that the slowly leaking check valve 101 retards the retracting stroke of pen arm retracting motor 85. The retracting stroke takes place as soon as flapper 152 leaves nozzle 135, releasing valve operating bellows 137 to contract under its inherent spring pressure so as to close valve plunger 143 to the pressure side of the system and open valve element 147 to atmosphere as shown in FIGURE 13.

The operation of a device of the character shown in FIGURE 13 will be better understood by considering the embodiment shown in FIGURES 14 to 17. The hub 37 carries flapper 152 which has a suitable spring steel end 152′ travelling in a circular path. At a suitable point in its travel adjoining the point at which chart changing is to take place, flapper 152′ encounters cam 153 to deflect it from its free shape away from the position of orifice 135 in a position to clear the orifice. Before it encounters orifice 135 in its path cam 153 terminates and flapper 152′ tends to regain its free shape but before it loses all of its deflection, the flapper 152′ seats on the tip of orifice 135 and closes the orifice. When this occurs, the bellows or valve changing motor 137 is energized as previously described to begin the motion of the forked pusher so that the chart plate 47 is moved to a position 47′ in FIGURE 14. When this happens the chart plate 47 encounters lever 154 pivoted at 155 on the frame to deflect its opposite end 156 against the tension of helical tension spring 157, anchored on the frame, so as to deflect flapper 152′ off the orifice 135 and move it close enough to magnet 158 so that the flapper 152 is held by the magnet away from the orifice 135.

At this moment when the orifice is uncovered, the chart changing motor 57 begins to retract and the chart plate 47 returns to a position as shown in solid line in FIGURE 14. The flapper end 152′ continues its circular path in engagement with the magnet 158 until it passes out of the range of the magnet 158 and regains its free shape. By this time it is beyond the orifice and can no longer close the orifice. The action of the chart changer itself is the same as that previously described.

If for any reason it is desired to operate the chart changer in response to some other condition than the position of rotation of an arm carried by the chart motor, a second relay system, of one of the characters described, will suitably be installed connected to the pneumatic system in parallel so that it can operate the chart changing motor and the pen arm retracting motor. This separate relay system may be operated according to any desired independent condition, at any desired remote location, for example as part of a master control which will change all charts at the same moment if desired.

The operation of the device of the invention to set it to release a chart at a selected time is described below. For example, suppose that it is desired to change the chart on the particular recorder at 8 a.m. on each day. Let us assume that the chart motor is a spring driven motor which has been wound and the shaft 32 is properly turning.

(1) The first step is to loosen set screws 35 and 41 shown in FIGURE 1a to permit both hub elements 34 and 37 to be turned independently of shaft 32 and to permit hub member 37 to be turned independently of hub member 34.

(2) Hub arm 38 (FIGURE 1a) or 152 (FIGURE 15) is turned until the chart changing motor 57 and the pen arm retracting motor 85 both operate, taking care to stop the rotation of the hub arm exactly at the point at which operation begins.

(3) Holding hub arm 38 or 152 still, chart plate 47 and the hub 34 are turned together to align time mark 56 on the chart plate with time pointer 158 on the case 30 (FIGURE 1).

(4) Then set screw 41 in FIGURE 1a is tightened so that the entire hub assembly 33 and chart plate 47 will move as a unit when they are rotated.

(5) A succession of charts 54 and chart retaining discs 55 are then loaded on the hub as previously explained, each chart being accordingly aligned so that the 8 a.m. mark on the chart is opposite the time mark 56 on the chart plate (FIGURE 1a).

(6) Let us assume that it is 2 p.m. when the chart changer is being placed in service. The chart plate and all the charts on it and turning with it are turned as a unit until the 2 p.m. time arc line of the outermost chart is in line with the time pointer 158 (FIGURE 1) which of course is synchronized with the pen arm and pen.

(7) Finally set screw 35 (FIGURE 1a) is tightened so that the chart motor shaft 32 and the chart hub assembly 33 including hub arm 38 and the chart plate 47 and the charts 54 will turn together as a unit.

It will be evident that one of the important features of the invention is the use of chart retainer discs 55 to hold the charts 54 in place and to release the charts 54 by their cooperative action with the hub 34.

It will also be evident that another important aspect of the invention is that the chart plate cooperates with the chart retaining discs and charts as they move axially toward and away from the outer end of the hub.

It will also be evident that the forked pusher cooperates with the chart retaining discs and the hub to release the charts.

It will further be evident that according to the invention the pen arm remains remote from the paper during chart changing so that no extraneous line is produced by the pen which will cause difficulty especially when an electronic scanner is used to scan the charts.

It should be apparent that the device is capable of being used regardless of the character of chart turning motor which is employed. The energy to change the chart is not derived from the chart turning motor and even chart turning motors operating on relative small batteries can be effectively used with the device of the present invention.

It will further be evident that the device of the invention will operate regardless of the thickness of the paper or other material used in making the charts.

A valuable feature of the present invention is that it can be used with standard charts without cutting extra slots or otherwise modifying the construction of the charts.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a recorder, a recorder shaft, means for turning the recorder shaft, a hub on the recorder shaft, said hub having a latching projection on the outer end and having a latching recess on the hub toward the recorder shaft from the latching projection, a chart retaining disc surrounding the hub toward the outer end, said chart retaining disc having resilient latch means which has a retracted position which clears the latching projection and has a latching position in which it enters the latching recess and is held by the latching projection, a chart surrounding the hub on the side of the hub remote from the outer end, and spring means urging the chart and the chart retaining disc toward the outer end of the hub.

2. A recorder of claim 1, in combination with pusher means for pushing the chart retaining disc axially and permitting the latch means to move into its retracted position and release the chart.

3. A recorder of claim 2, in combination with an arm mounted on and turning with the hub, and actuator means operated by the arm for energizing said pusher means.

4. A recorder of claim 3, in combination with means for adjusting said arm angularly with respect to said hub.

5. A recorder of claim 3, in which the pusher means comprises a fluid operated motor, and in which said actuator means operated by the arm comprises a source of fluid pressure, valve means connected at one side to the source of fluid pressure and at the other side to the fluid motor, and mechanism operated by said arm for opening said valve means and actuating said fluid operated motor.

6. A recorder of claim 5, in combination with fluid operated means for retracting said valve means connected to said valve means and a delay device interposed between said valve means and said fluid operated means for retracting said valve means.

7. A recorder of claim 6, in combination with a pen arm cooperating with said chart, a fluid operated pen arm retracting motor connected to said valve means on the side remote from said source of fluid pressure, and slowly leaking check valve means interposed between said valve means and said fluid operated pen arm retracting motor for releasing said pen arm after a period of delay.

8. A recorder of claim 3, in which said pusher means comprises a pusher fluid motor, and in which said actuator means comprises a source of fluid pressure, valve means connected at one side to said source of fluid pressure, a fluid system connecting the other side of said valve means to said pusher fluid motor, a fluid actuated valve operating motor connected to said valve means in said fluid system, orifice means normally discharging from said fluid system and depriving said valve operating fluid motor of fluid pressure, said arm at one position in its path closing said orifice means and energizing said fluid actuated valve operating motor to energize said pusher fluid motor.

9. A recorder of claim 8, in combination with a pen arm in one position cooperating with said chart, and a pen arm retracting fluid operated motor operatively connected to said fluid system on the side of said valve remote from said source of fluid pressure.

10. A recorder of claim 9, in combination with means responsive to operation of said pusher means for deflecting said arm from said orifice.

11. A recorder of claim 1, having a plurality of chart retaining discs and charts in sequence surrounding said hub and retained by said latching projection.

12. A recorder of claim 11, in combination with a chart plate surrounding said hub between the last of said sequence of charts and said spring means, in combination with means for turning said chart plate with the hub.

13. A recorder of claim 12, in combination with resilient latch means on the chart plate which has a retracted position which clears the latching projection and a latching position in which it enters the latching recess and is held by the latching projection.

14. A recorder of claim 12, in combination with resilient pusher means on said chart plate and said chart retaining discs for pushing the chart in the process of being removed from the recorder.

15. A recorder of claim 11, in combination with resilient pusher means on the second chart retaining disc from the outer end of the hub for pushing the first chart off the hub when its latch means releases.

16. A recorder of claim 1, in combination with a chart plate surrounding the hub between the chart which is most remote from the outer end and said spring means, in combination with means for turning the chart plate with the hub.

17. A recorder of claim 16, in combination with resilient latch means on said chart plate which has a retracted position which clears the latching projection and a latching position in which it enters the latching recess and is held by the latching projection.

18. A recorder of claim 16, in combination with a resilient pusher means on said chart plate for pushing off the chart which is next to said chart plate when it is to be removed.

References Cited by the Examiner
UNITED STATES PATENTS

| | | | |
|---|---|---|---|
| 2,270,975 | 1/1942 | Smith | 346—137 |
| 2,483,427 | 10/1949 | Nicholson et al. | 346—134 |
| 3,196,452 | 7/1965 | Mullins et al. | 346—137 |

RICHARD B. WILKINSON, *Primary Examiner.*